US011262701B2

(12) United States Patent
Lin et al.

(10) Patent No.: US 11,262,701 B2
(45) Date of Patent: Mar. 1, 2022

(54) HOLOGRAPHIC DISPLAY DEVICE AND ELECTRONIC DEVICE

(71) Applicants: Fuzhou BOE Optoelectronics Technology Co., Ltd., Fujian (CN); BOE TECHNOLOGY GROUP CO., LTD., Beijing (CN)

(72) Inventors: Linlin Lin, Beijing (CN); Bo Hu, Beijing (CN); Wenchang Tao, Beijing (CN); Zhendian Wu, Beijing (CN); Xinmao Qiu, Beijing (CN); Yaochao Lv, Beijing (CN)

(73) Assignees: Fuzhou BOE Optoelectronics Technology Co., Ltd., Fuqing (CN); BOE Technology Group Co., Ltd., Beijing (CN)

( * ) Notice: Subject to any disclaimer, the term of this patent is extended or adjusted under 35 U.S.C. 154(b) by 252 days.

(21) Appl. No.: 16/537,113

(22) Filed: Aug. 9, 2019

(65) Prior Publication Data
US 2020/0272102 A1 Aug. 27, 2020

(30) Foreign Application Priority Data

Feb. 26, 2019 (CN) .......................... 201910142339.8

(51) Int. Cl.
*G03H 1/22* (2006.01)
(52) U.S. Cl.
CPC ......... *G03H 1/2294* (2013.01); *G03H 1/2202* (2013.01); *G03H 2222/13* (2013.01); *G03H 2223/15* (2013.01); *G03H 2223/16* (2013.01)
(58) Field of Classification Search
CPC ....... G03H 2223/16; G03H 2001/0216; G03H 1/2294; G03H 1/2202; G03H 2222/13;
(Continued)

(56) References Cited

U.S. PATENT DOCUMENTS 4,290,668 A * 9/1981 Ellis ..................... G02B 6/3834
359/900
6,424,436 B1 * 7/2002 Yamanaka ........... G02B 5/1833
235/462.01
(Continued)

FOREIGN PATENT DOCUMENTS

CN 1396497 A 2/2003
CN 101189543 A 5/2008
(Continued)

OTHER PUBLICATIONS

First Office Action to Chinese Application No. 201910142339.8 dated Sep. 16, 2020 with English translation, (19p).
(Continued)

*Primary Examiner* — Audrey Y Chang
(74) *Attorney, Agent, or Firm* — Arch & Lake LLP

(57) ABSTRACT

The present disclosure relates to a holographic display device and an electronic device. The holographic display device may include a light source, a light transmission structure, a first photonic crystal group, and a spatial light modulator. The light transmission structure has a light incident surface and a light exiting surface. The first photonic crystal group is disposed between the light incident surface and the light source. The first photonic crystal group includes various photonic crystals for dividing light emitted by the light source into light beams of different colors. The light beams of different colors are transmitted into the light transmission structure through the light incident surface and emitted through the light exiting surface. The spatial light modulator corresponds to the light exiting surface for modulating light beams of different colors emitted from the light exiting surface to form a holographic image.

18 Claims, 3 Drawing Sheets

(58) Field of Classification Search
CPC .. G03H 2223/15; G02B 6/0026; G02B 6/023; G02B 6/0008; G02B 6/0006; G02B 27/0994; G02B 2027/0174; G02B 27/0172; G02B 1/005
USPC .......... 359/15, 34; 385/146; 353/31
See application file for complete search history.

(56) References Cited

U.S. PATENT DOCUMENTS

| | | | |
|---|---|---|---|
| 10,884,171 B2* | 1/2021 | Kim | G02F 1/1343 |
| 2003/0090632 A1* | 5/2003 | Kim | G02B 27/0994 |
| | | | 353/31 |
| 2005/0259942 A1 | 11/2005 | Temelkuran et al. | |
| 2013/0070510 A1 | 3/2013 | Allot et al. | |
| 2013/0328866 A1* | 12/2013 | Woodgate | G02B 6/005 |
| | | | 345/419 |
| 2015/0160529 A1* | 6/2015 | Popovich | G02F 1/13342 |
| | | | 359/200.8 |

FOREIGN PATENT DOCUMENTS

| | | |
|---|---|---|
| CN | 101971637 A | 2/2011 |
| CN | 104656259 A | 5/2015 |
| CN | 108490756 A | 9/2018 |
| CN | 110727192 A | 1/2020 |

OTHER PUBLICATIONS

Li Jing Town, "Optics Handbook Part 1" Publication Date Jul. 31, 2010 (13p).

* cited by examiner

HOLOGRAPHIC DISPLAY DEVICE AND ELECTRONIC DEVICE

CROSS-REFERENCE TO RELATED APPLICATIONS

The present application is based on and claims priority to Chinese Application No. 201910142339.8, filed on Feb. 26, 2019, the entire contents of which are incorporated herein.

TECHNICAL FIELD

The present disclosure relates to the field of display technologies, and in particular, to a holographic display device and an electronic device.

BACKGROUND

With the continuous development of display technology, there is a widespread concern on the holographic display technology which has an ability to satisfy all the perceptions of human eye vision, and by which it is not necessary for an observer to observe without using auxiliary devices such as helmets and glasses. However, the current holographic display device has a relatively complicated structure and a relatively large volume, which is disadvantageous for integration into portable electronic devices.

It should be noted that the information disclosed in the background section above is only intended to enhance understanding of the background of the present disclosure, and thus may include information that does not constitute prior art known to those of ordinary skill in the art.

SUMMARY

A first aspect of the present disclosure provides a holographic display device. The holographic display device includes a light source. The holographic display device includes a light transmission structure having a light incident surface and a light exiting surface. The holographic display device includes a first photonic crystal group disposed between the light incident surface and the light source. The first photonic crystal group includes various photonic crystals configured to divide light emitted by the light source into light beams of different colors. The light beams of different colors are transmitted into the light transmission structure through the light incident surface, and emitted through the light exiting surface. The holographic display device includes a spatial light modulator corresponding to the light exiting surface. The spatial light modulator is configured to modulate the light beams of different colors emitted from the light exiting surface to form a holographic image.

In an exemplary arrangement of the present disclosure, the holographic display device further includes a second photonic crystal group disposed between the light exiting surface and the spatial light modulator. The second photonic crystal group has the same structure as that of the first photonic crystal group.

In an exemplary arrangement of the present disclosure, the light transmission structure includes an optical fiber having the light incident surface and the light exiting surface.

In an exemplary arrangement of the present disclosure, the optical fiber includes a uniform type optical fiber in which refractive indices are uniform throughout a core of the uniform type optical fiber.

In an exemplary arrangement of the present disclosure, the holographic display device further includes an optical time delay group disposed between the first photonic crystal group and the light incident surface. The optical time delay group includes a plurality of optical time delay units. Each of the optical delay units respectively corresponds to each of the photonic crystals. Delay durations of the optical time delay units corresponding to the photonic crystals that allow the light beams of different colors to pass through in the various photonic crystals are different.

In an exemplary arrangement of the present disclosure, the various photonic crystals include a first photonic crystal capable of transmitting red light, a second photonic crystal capable of transmitting green light, and a third photonic crystal capable of transmitting blue light. The plurality of optical time delay units include a first optical time delay unit corresponding to the first photonic crystal, a second optical time delay unit corresponding to the second photonic crystal, and a third optical time delay unit corresponding to the third photonic crystal. A delay duration of the second optical time delay unit is smaller than a delay duration of the third optical time delay unit, and is greater than a delay duration of the first optical time delay unit.

In an exemplary arrangement of the present disclosure, the optical fiber includes a graded optical fiber, a core of which has a refractive index gradually decreasing in a direction from a center of the core to an edge thereof in the graded optical fiber.

In an exemplary arrangement of the present disclosure, the various photonic crystals include a first photonic crystal capable of transmitting red light, a second photonic crystal capable of transmitting green light, and a third photonic crystal capable of transmitting blue light. In the direction from the center of the core to the edge thereof in the graded optical fiber, the core of the graded optical fiber includes a central region corresponding to the third photonic crystal, an intermediate region corresponding to the second photonic crystal and an edge region corresponding to the first photonic crystal.

In an exemplary arrangement of the present disclosure, the first photonic crystal group is symmetrical about a central axis of the graded optical fiber.

In an exemplary arrangement of the present disclosure, the holographic display device includes a collimator disposed between the light exiting surface and the spatial light modulator.

In an exemplary arrangement of the present disclosure, the holographic display device further includes a lens structure disposed at a side of the spatial light modulator facing away from the light transmission structure.

In an exemplary arrangement of the present disclosure, the light incident surface and the light exiting surface are disposed opposite to each other in an axial direction of the light transmission structure.

In an exemplary arrangement of the present disclosure, the light incident surface and the light exiting surface are located on the same side of the light transmission structure.

A second aspect of the present disclosure provides an electronic device including the holographic display device of any of the above arrangements.

The above general description and the following detailed description are intended to be illustrative and not restrictive of the present disclosure.

BRIEF DESCRIPTION OF THE DRAWINGS

The accompanying drawings are incorporated in and constitute part of the specification, show the arrangements of the present disclosure and are intended to explain the principle of the present disclosure together with the description. It is apparent that the accompanying drawings in the following description are only some of the arrangements of the present disclosure, and other drawings may be obtained from these accompanying drawings by those skilled in the art without any creative work.

FIG. 1 is a schematic structural view of a holographic display device according to an arrangement of the present disclosure.

DETAILED DESCRIPTION

Figure 1:
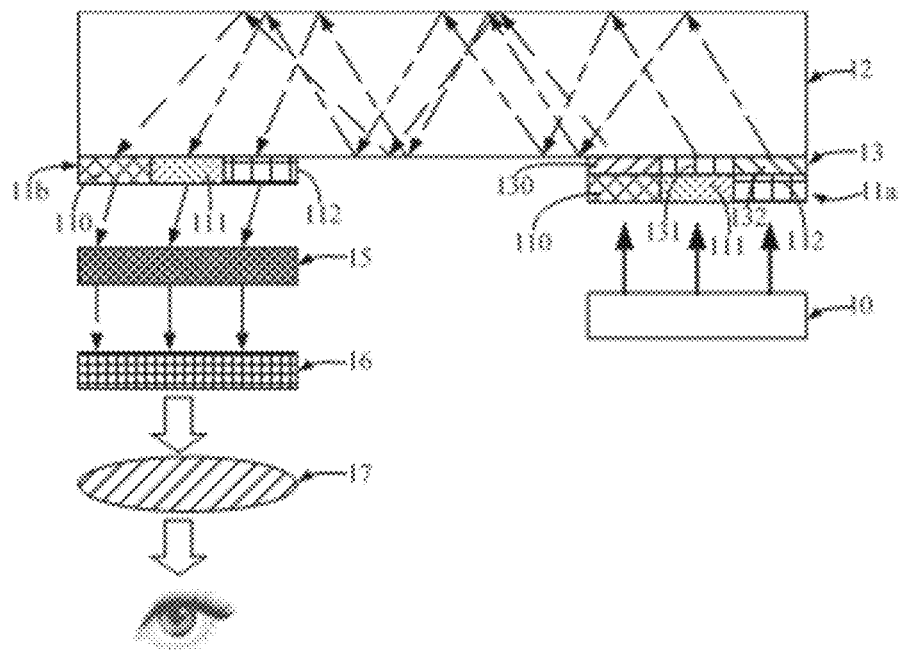

Example arrangements will now be described more fully with reference to the accompanying drawings. However, the example arrangements can be embodied in a variety of forms, and should not be construed as being limited to the arrangements set forth herein; rather, these arrangements are provided so that this disclosure will be thorough and complete, and the concepts of the example arrangements will be fully given to those skilled in the art. The same reference numerals in the drawings denote the same or similar structures, and thus their detailed descriptions will be omitted.

Although the relative terms such as "on", "below", "upper" and "lower" are used in the specification to describe the relative relationship of one component to another component, these terms are used in this specification for convenience only, for example, a direction in the example according to the accompanying drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

The terms such as "a", "an", "the" and "said" are used to indicate the presence of one or more elements/components. The terms "comprise", "include", "have", "contain" and their variants are used to be open-type and are meant to include additional elements/components, etc., in addition to the listed elements/components/etc. The terms "first", "second", etc. are used only as marks, rather than limitation for the number of objects.

The holographic display technology is considered as an ultimate solution for achieving 3D display. The principle of the holographic display technology may be summarized as follows: the hologram may reproduce a three-dimensional virtual image or a three-dimensional real image in space, and each point on the hologram transmits information in all directions of the space, and each observation point in the space may see the whole image.

At present, the holographic display technology may be divided into optical holography and computational holography. The optical holography uses the principle of interference to introduce a reference light wave related to the object light wave to interfere with the object light wave, and record the amplitude and phase information of the object light wave in the form of interference fringes on a certain medium; then, using the principle of light wave diffraction, the original light wave is reproduced by the diffraction of the light wave. The computational holography combines the principle of optical holography with computer technology, making the application of holographic technology more extensive and flexible. At the same time, as the development of optoelectronic display technology, the research of real-time holographic stereoscopic display technology is gradually developing in a practical direction. The digital hologram obtained by the computational holography may realize real-time photoelectric reproduction by high-resolution electrically addressed spatial light modulator and computer controlling, which provides a new technical basis for real-time dynamic reproduction of hologram.

In the related art, a common holographic display device includes: a time division multiplexing device (which uses a three-primary light source to illuminate single chip spatial light modulator in a time-division way for performing optical reconstruction), a space division multiplexing device (which uses three-primary light source to respectively illuminate three spatial light modulators for performing optical reconstruction, and for realizing a synthesis of three monochromatic holographic reconstructed images in a reconstruction plane), a spatial division device, a spatial superimposing device, and the like. The common feature of these holographic display devices is that multiple light sources or multiple spatial light modulators are required to perform optical reconstruction to form a holographic image, resulting in a complicated structure and a relatively large volume of the holographic display device, which is disadvantageous for integration into a small-sized electronic device (for example, a wearable electronic device such as a watch or a wristband).

In order to solve the above technical problem, an arrangement of the present disclosure provides a holographic display device, which can be applied to an electronic device such as a mobile phone, a computer, a television, a watch, a wristband, and the like.

Figure 4:
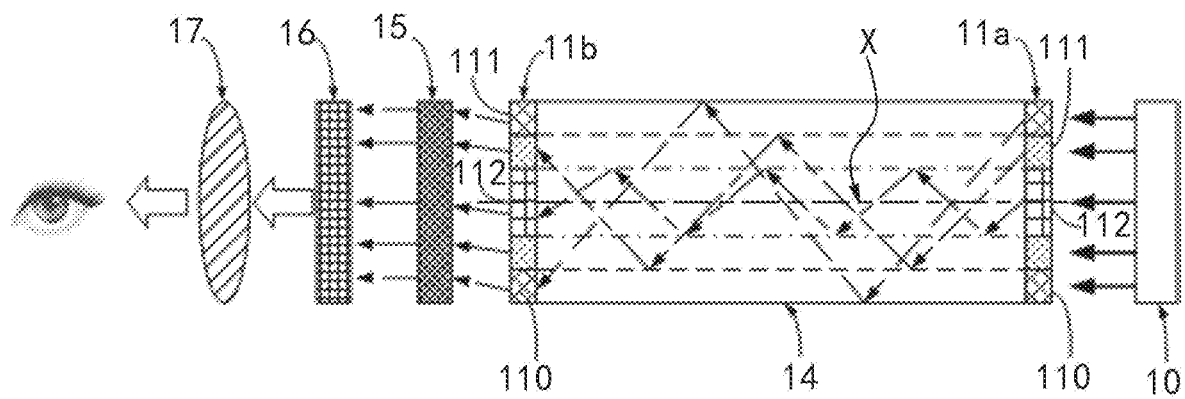
FIG. 4 is a schematic structural view of a holographic display device according to another arrangement of the present disclosure.

In this arrangement, as shown in FIGS. 1 and 4, the holographic display device may include a light source 10, a light transmission structure 18, a first photonic crystal group 11a, and a spatial light modulator 16.

The light emitted by the light source 10 (as shown by the bold solid arrows in FIGS. 1 and 4) may be white light, but is not limited thereto, and may be other multi-color light.

Figure 2:
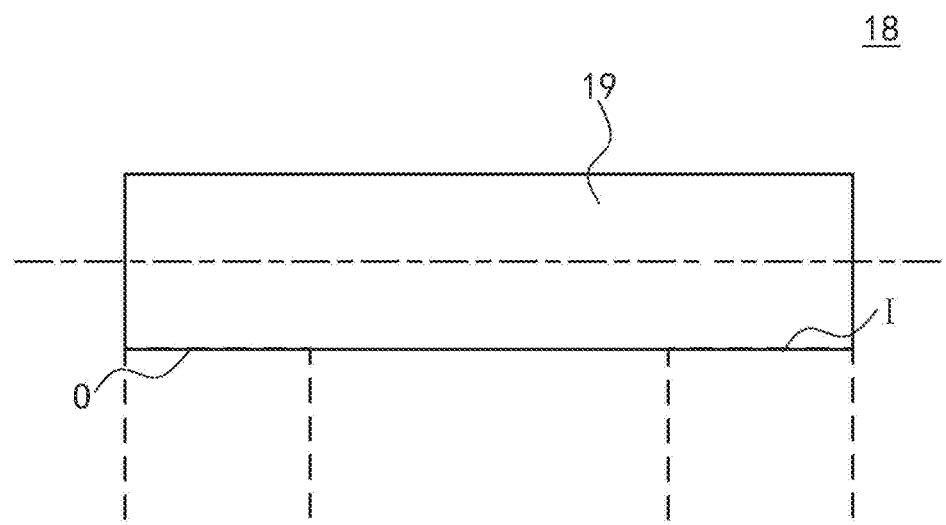
FIG. 2 is a schematic view of a light transmission structure of the holographic display device of FIG. 1.
Figure 5:
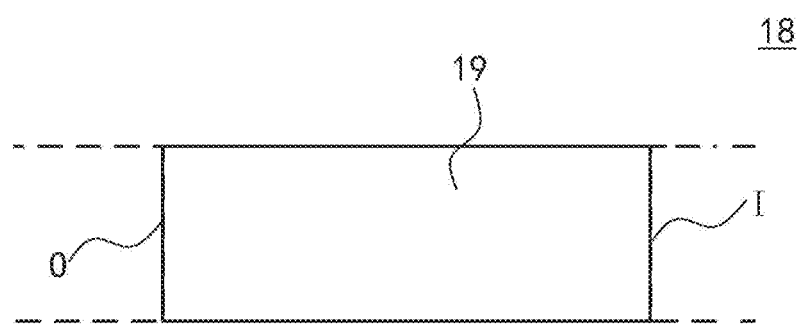
FIG. 5 is a schematic view of the light transmission structure of the holographic display device of FIG. 4.

The light transmission structure 18 is intended to transmit external light to a specified location. Specifically, as shown in FIG. 2 and FIG. 5, the light transmission structure 18 may have a light incident surface I and a light exiting surface O. The external light may be transmitted into the light transmission structure 18 through the light incident surface I, and emitted through the light exiting surface O. The areas of the light incident surface I and the light exiting surface O are not limited. FIGS. 2 and 5 are merely different exemplary arrangements, and are not limited to this arrangement.

The light incident surface I and the light exiting surface O may be opposite to each other in the axial direction of the light transmission structure 18, or may be located on the same side of the light transmission structure 18, but is not limited thereto. The location relationship of the light incident surface I and the light exiting surface O may be specifically designed according to arrangement relationship of other structures in the holographic display device. As long as the volume of the hologram display device can be reduced without affecting the hologram display effect.

For example, the light transmission structure 18 may include an optical fiber 19 having the aforementioned light incident surface I and the light exiting surface O. That is, in the present arrangement, the optical fiber 19 may be used for light conduction. The transmission principle of the optical fiber 19 is "total reflection of light", which ensures that there is substantially no loss of light energy, thus improving the holographic display effect. Also, the optical fiber 19 has an extremely wide transmission band and may be transmitted in a full band. In addition, since the optical fiber 19 could be bent, the light transmission by using the optical fiber 19 may reduce the volume of the holographic display device, facilitating integration of the holographic display device into a small-sized electronic device, such as a wearable electronic device such as a watch or a wristband.

It should be noted that the optical fiber 19 may include a core and a sheath sleeved outside the core. The core is used to transmit light, and the sheath is used to protect the core and may be plastic, which is not limited thereto. Lights of different wavelengths pass through the core of the optical fiber at different speeds.

The light transmission structure 18 may also include a light guide plate, i.e., the optical fiber 19 may also be a light guide plate. The material of the light guide plate may be acrylic or PC plate, which has a similar function to the fiber, i.e., conducting light. Of course, the optical fiber 19 may also be other structures as long as light conduction can be achieved. The person skilled in the art can select a suitable light transmission structure 18 according to the required size of the electronic device.

The first photonic crystal group 11a may include a photonic crystal, which refers to an artificial periodic dielectric structure having a photonic band gap abbreviated as PBG) characteristics and the so-called photonic band gap refers to a wave in a certain frequency range that cannot propagate in this periodic structure, i.e., the structure itself has a "forbidden band". That is, when the frequency of the light in the incident light (i.e., the light incident on the photonic crystal) falls in the photonic band gap, the light cannot pass through the photonic crystal; and when the frequency of the light in the incident light does not fall in the photonic band gap, the light can pass through the photonic crystal.

It should be noted that, the wavelengths of the light of different colors are different, and the wavelength is related to the frequency, therefore, in order to enable the first photonic crystal group 11a to divide the polychromatic light (for example, white light) into light of a plurality of different colors (or a plurality of light beams of different colors), the first photonic crystal group 11a may include various photonic crystals, which refer to a plurality of different kinds of photonic crystals. In this arrangement, different kinds of photonic crystals may allow lights of different colors to pass through, such that when the first photonic crystal group 11a is disposed on the light incident surface I of the light transmission structure 18, the first photonic crystal group 11a may divide the light emitted by the light source 10 into lights of a plurality of different colors by using various photonic crystals, and lights of the plurality of different colors may be transmitted into the light transmission structure 18 through the light incident surface I and emitted through the light exiting surface O.

It should be understood that the light allowed to pass through each photonic crystal may be monochromatic light such as red light, green light, blue light, which is not limited thereto, and may be multi-color light mixed by at least two kinds of monochromatic light.

For example, the aforementioned photonic crystal may be a one-dimensional photonic crystal, but is not limited thereto. The one-dimensional photonic crystal may be fabricated by a vacuum coating technique, a MOCVD (Metalorganic Chemical Vapor Deposition) technique or the like.

The spatial light modulator 16 (SLM) is disposed corresponding to the light exiting surface O of the light transmission structure 18, and is configured to receive lights of a plurality of different colors emitted from the light exiting surface O, and then to modulate the received lights of the plurality of different colors to form a holographic image. Specifically, after receiving lights of the plurality of different colors, the spatial light modulator 16 modulates the phase and amplitude of these lights according to data provided by the data source connected to the spatial light modulator 16, thus enabling display of the holographic image. The specific structure of the spatial light modulator 16 is well known in the related art and will not be described herein.

In this arrangement, the first photonic crystal group 11a is disposed to divide the light emitted by the light source 10 into lights of a plurality of different colors, and then the lights are conducted to the spatial light modulator 16 through the light transmission structure 18 to form a holographic image. Thus, the holographic display device of the present arrangement can realize holographic display only by one light source 10 and one spatial light modulator 16, and the numbers of the light sources 10 and the spatial light modulators 16 can be reduced as compared with the holographic display device mentioned in the related art, simplifying the structure of the holographic display device, reducing the volume of the holographic display device, compactness and thinness the holographic display device, and thus facilitating integration of the holographic display device into a smaller electronic device.

In one arrangement, as shown in FIG. 1, the aforementioned optical fiber 19 may be a uniform optical fiber 12 having equal refractive indices throughout the core, and the uniform optical fiber 12 utilizes the principle of total internal reflection of light on two different dielectric surfaces to limit the propagation of light in the core. The lights having different wavelengths pass through the core of the fiber at different speeds. Since the lights having different wavelengths present different colors, transmission speeds of these lights of different colors in the core are different. It should be understood that, after entering the uniform optical fiber 12 at the same time, the lights of different colors are sequentially emitted from the light exiting surface O, realizing separation between lights of different colors, and thus realizing holographic display.

In the present arrangement, conduction using the uniform optical fiber 12 can not only ensure that there is substantially no loss of light energy, thus improving the holographic display effect, but also ensure that the cost of the holographic display device can also be reduced since the uniform type optical fiber 12 is low in cost.

Optionally, when the optical fiber 19 is a uniform optical fiber 12, in order to improve the display effect of the holographic display device, as shown in FIG. 1, the holographic display device may further include an optical time delay group 13 disposed between the first photonic crystal group 11a and the light incident surface I of the uniform optical fiber 12, the optical time delay group 13 is used to delay the light passing through the first photonic crystal group 11a, and then the delayed light may enter the uniform optical fiber 12 through the first photonic crystal group 11*a* and may be transmitted to the spatial light modulator 16 via the uniform optical fiber 12.

In detail, the optical time delay group 13 may include a plurality of optical time delay units, and each of the optical delay units respectively corresponds to each of photonic crystals. It should be understood that the optical time delay units and the photonic crystals may disposed in a one-to-one correspondence (as shown in FIG. 1), however, it is not limited thereto. Alternatively, one optical time delay unit may correspond to a plurality of photonic crystals. Alternatively, one photonic crystal may correspond to a plurality of optical time delay units. The delay durations of the optical time delay units corresponding to different kinds of photonic crystals in various photonic crystals are different. The above-mentioned different kinds of photonic crystals respectively allow lights of different colors to pass through and transmission speeds of lights of different colors are different, so that lights of different colors may respectively delayed via optical time delay units having different delay durations by correspondingly providing these optical time delay units having different delay durations at a side of different types of photonic crystals facing towards the light incident surface I so as to adjust the time that each of lights of different colors entering the uniform optical fiber 12. Thus, there is a larger difference in exiting times of lights of different colors (i.e., the exiting time refers to the time that the light exiting from the light exiting surface O) in order to further improve the display effect of the hologram display device. The plurality of optical time delay units may be a plurality of optical time delay apparatuses, each of which is adjusted to delay light of one color. Alternatively, the optical time delay unit group is an optical time delay apparatus configured to have a plurality of optical time delay units, and each optical time delay unit delays lights of different colors. Specifically, as shown in FIG. 1, the optical time delay apparatus is configured to have three parallel optical time delay units, wherein the first optical time delay unit 130 is disposed corresponding to the first photonic crystal 110, the second optical time delay unit 131 disposed corresponding to the second photonic crystal 111, and the third optical delay unit 132 is disposed corresponding to the third photonic crystal 112. The duration of each delay unit may be set such that the lights passing through different delay units have different delay durations.

For example, as shown in FIG. 1, the aforementioned various photonic crystals may include a first photonic crystal 110 capable of transmitting red light R (as indicated by the dashed arrow in FIGS. 1 and 4), a second photonic crystal 111 capable of transmitting green light G (as shown by the double-pointed arrows in FIGS. 1 and 4) and a third photonic crystal capable of transmitting blue light B (as indicated by the single-pointed arrows in FIGS. 1 and 4). The plurality of optical time delay units mentioned above may include a first optical time delay unit 130 corresponding to the first photonic crystal 110, a second optical time delay unit 131 corresponding to the second photonic crystal 111, and a third optical time delay unit 132 corresponds to the third photonic crystal 112.

The wavelength of the red light R is about 780 nm to 630 nm, the wavelength of the green light G is about 570 nm to 500 nm, and the wavelength of the blue light B is about 470 nm to 420 nm. It is obvious that the wavelength of the green light G is greater than the wavelength of the blue light B, and is smaller than the wavelength of the red light R. Since the wavelength is proportional to the transmission speed, the transmission speed of the green light G is greater than the transmission speed of the blue light B and is smaller than the transmission speed of the red light R.

Figure 3:
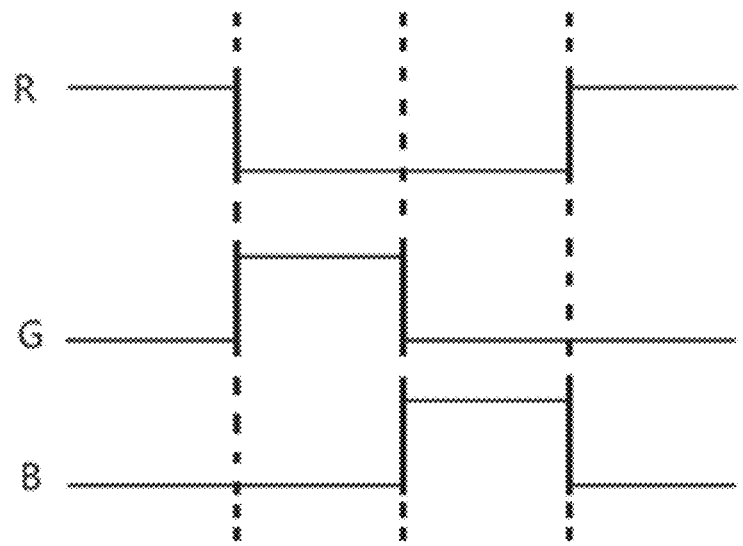
FIG. 3 is a loading sequence diagram of light beams of different colors after using an optical time delay group according to an arrangement of the present disclosure.

In this arrangement, in order to make the differences between exiting times of the red light R, the green light and the blue light B larger, the delay duration of the second optical time delay unit 131 may be smaller than the delay duration of the third optical time delay unit 132, and may be larger than the delay duration of the first optical time delay unit 130, so that the time that the green light G enters the uniform optical fiber 12 is later than the time that the red light R enters the uniform optical fiber 12, and is earlier than the time that the blue light B enters the uniform optical fiber 12 (as shown in FIG. 3), making the difference between the exiting times of the red light R, the green light and the blue light B larger, alleviating the mixing of the red light R, the green light G and the blue light B in the uniform optical fiber, and thus improving the holographic display effect of the hologram display device.

Figure 6:
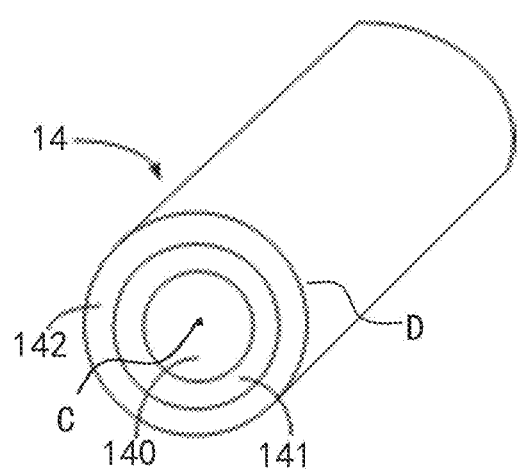
FIG. 6 is a schematic structural view of a graded optical fiber according to an arrangement of the present disclosure.

In another arrangement, as shown in FIGS. 4 and 6, the aforementioned optical fiber 19 may include a graded optical fiber 14, in a direction from the center C of the core to the edge D thereof in the graded optical fiber 14, the refractive index of the core in the optical fiber 14 is gradually reduced. Further, portions of the graded optical fiber 14 having the same distance from its axis have the same refractive index. The refractive index of the core in the graded optical fiber 14 is inversely proportional to the transmission speed thereof, that is, in the direction from the center C of the core of the graded optical fiber 14 to the edge D thereof, the transmission speed of the core of the graded optical fiber 14 gradually increases.

Alternatively, the portions of the graded optical fiber 14 having different refractive indices on the core may respectively correspond to different kinds of photonic crystals, so that lights transmitted from different kinds of photonic crystals may be respectively transmitted in various portions of the core (the various portions refer to various portions having different refractive indices), such that the exiting times of lights of different colors can be adjusted. Specifically, by adjusting the arrangement relationship between photonic crystals and the graded optical fiber 14, the difference between the exiting times of lights of different colors becomes larger, so that the display effect of the holographic display device can be improved.

For example, the plurality of photonic crystals mentioned above may include a first photonic crystal 110 capable of transmitting red light R, a second photonic crystal 111 capable of transmitting green light and a third photonic crystal 112 capable of transmitting blue light B. The third photonic crystal 112, the second photonic crystal 111, and the first photonic crystal 110 in the first photonic crystal group 11*a* are sequentially disposed in the direction from the center C of the core of the graded optical fiber 14 to the edge D thereof.

Specifically, since the transmission speed of the green light G is greater than the transmission speed of the blue light B and is smaller than the transmission speed of the red light R, and in the direction from the center C of the core to the edge D thereof in the graded optical fiber 14, the refractive index of the core in the graded optical fiber 14 gradually decreases; therefore, in order to make the difference between the exiting times of the red light R, the green light and the blue light B larger, in the present arrangement, the core of the graded optical fiber 14 may include a central region 140, an intermediate region 141 and an edge region 142 sequentially disposed in the direction from the center C of the core to the edge D thereof in the graded optical fiber 14 (as shown in FIG. 6), wherein the third photonic crystal 112 may correspond to the central region 140 of the core in the optical fiber 14, i.e., the light transmitted from the third photonic crystal 112 can be transmitted in the graded optical fiber 14 within the range of the central region 140; the second photonic crystal 111 may correspond to the intermediate region 141 of the core in the graded optical fiber 14, i.e., the light transmitted from the second photonic crystal 111 can be transmitted in the graded optical fiber 14 within the range of the intermediate region 141; the first photonic crystal 110 may correspond to the edge region 142 of the core in the graded optical fiber 14, i.e., the light transmitted from the first photonic crystal 110 can be transmitted in the graded optical fiber 14 within the range of the edge region 142. This not only makes the difference between the exiting time of the red light R, the green light and the blue light B larger, but also alleviates the mixing of the red light R, the green light and the blue light B in the graded optical fiber 14. Thus, the holographic display effect of the holographic display device can be improved.

Further, since refractive indices of portions of the graded optical fiber 14 having the same distance from its axis are equal, the first photonic crystal group 11a in this arrangement may be symmetric with respect to the central axis X of the graded optical fiber 14 (as shown in FIG. 4). This can make full use of the structural characteristics of the graded optical fiber 14 while making the difference between the exiting times of lights of different colors larger (i.e., maximizing the division between lights of different colors), improving the utilization of light, and then improving the holographic display effect.

Since lights of different colors may be mixed together when transmitted in the light transmission structure 18, as shown in FIGS. 1 and 4, the holographic display device in this arrangement may further include a second photonic crystal group 11b having the same structure as that of the first photonic crystal group 11a. The second photonic crystal group 11b may be disposed between the light exiting surface O of the light transmission structure 18 and the spatial light modulator 16, for further dividing the light emitted from the light exiting surface O, thus avoiding the presence of the mixed light in the light received by the spatial light modulator 16, and thus resulting in a poor holographic display effect. It should be noted that the second photonic crystal group 11b and the second photonic crystal group 11a are identical in structure, which means that they are completely identical. For example, the photonic crystals included in these photonic crystal groups are of the same type, and the arrangements of the photonic crystals are the same. In other words, they may replace each other. For example, the first photonic crystal group 11a includes a first photonic crystal 110 capable of transmitting red light R (as indicated by the dashed arrow in FIGS. 1 and 4), a second photonic crystal 111 capable of transmitting green light G (as shown by the double-pointed arrows in FIGS. 1 and 4) and a third photonic crystal 112 capable of transmitting blue light B (as indicated by the single-pointed arrows in FIGS. 1 and 4). The second photonic crystal group 11b also includes the same first photonic crystal 110 capable of transmitting red light R, the same second photonic crystal 111 capable of transmitting green light and the same third photonic crystal 112 capable of transmitting blue light B.

In addition, since the direction of the light emitted from the light exiting surface O of the light transmission structure 18 is relatively disordered, the light utilization efficiency is poor, resulting in a poor holographic display effect. Therefore, in order to improve the utilization of light, and improve the holographic display effect, as shown FIGS. 1 and 4, the holographic display device in this arrangement may further include a collimator 15 disposed between the light exiting surface O and the spatial light modulator 16 for collimating the light emitted from the light exiting surface O, such that more light is transmitted to the spatial light modulator 16 and modulated by the spatial light modulator 16 to form a holographic image.

As shown in FIGS. 1 and 4, the holographic display device of the present arrangement may further include a lens structure 17 disposed at a side of the spatial light modulator 16 facing away from the light transmission structure 18, and the lens structure 17 may be synthesize the hologram image formed by the spatial light modulator 16, and the synthesized hologram image is transmitted to the human eye. For example, the lens structure 17 may include a plurality of lenses, but is not limited thereto, and may be a single convex lens.

Based on the above structure, the specific working process of the holographic display device of the present arrangement may be that: the multi-color light (for example, white light) emitted by the light source 10 may be divided into lights of a plurality of different colors through the first photonic crystal group 11a; the lights of different colors enter the graded optical fiber 14 through the light incident surface I of the graded optical fiber 14 for total reflection and is emitted through the light exiting surface O of the graded optical fiber 14 (or lights of a plurality of different colors are first delayed by the optical delay group 13, then enter the uniform optical fiber 12 through the light incident surface I of the uniform optical fiber 12 for total reflection, and is emitted through the light exiting surface O of the uniform optical fiber 12); and lights of the plurality of different colors emitted from the light exiting surface O may be collimated by the collimator 15 and illuminated to the spatial light modulator 16 and modulated by the spatial light modulator 16 to form a holographic image; the holographic image may then be synthesized by the lens structure 17 and transmitted to the human eye.

To sum up, in the holographic display device and the electronic device provided by the present disclosure, the first photonic crystal group is disposed to divide the light emitted by the light source into lights of a plurality of different colors, and then the lights are conducted to the spatial light modulator through the light transmission structure to form a holographic image. Thus, the holographic display device of the present arrangement can realize holographic display only by one light source and one spatial light modulator, and the numbers of the light sources and the spatial light modulators can be reduced as compared with the holographic display device mentioned in the related art, simplifying the structure of the holographic display device, reducing the volume of the holographic display device, compactness and thinness the holographic display device, and thus facilitating integration of the holographic display device into a smaller electronic device.

In addition, the arrangement of the present disclosure further provides an electronic device, which includes the holographic display device described in any of the above arrangements, and the electronic device may be a portable electronic device such as a mobile phone, a tablet computer, a watch, a wristband, or the like, but is not limited thereto. Therefore, it may also be an electronic device such as a television or a desktop computer. Other arrangements of the present disclosure will be apparent to those skilled in the art after reading the specification and implementing the present disclosure disclosed herein. The present application is intended to cover any variations, purposes, or adaptations of the present disclosure, which are in accordance with the general principles of the present disclosure and include common general knowledge or conventional technical means in the art that are not disclosed in the present disclosure. The specification and arrangements are to be regarded as illustrative only, and the real scope and spirit of the present disclosure is defined by the attached claims.

What is claimed is:

1. A holographic display device, comprising:
a light source;
a light transmission structure, having a light incident surface and a light exiting surface;
a first photonic crystal group, disposed between the light incident surface and the light source, the first photonic crystal group comprising various photonic crystals configured to divide light emitted by the light source into light beams of different colors, the light beams of different colors transmitted into the light transmission structure through the light incident surface, and emitted through the light exiting surface;
a spatial light modulator corresponding to the light exiting surface, containing holographic data, and configured to modulate the light beams of different colors emitted from the light exiting surface to form a holographic image; and
an optical time delay group disposed between the first photonic crystal group and the light incident surface, the optical time delay group comprising a plurality of optical time delay units, each of the optical time delay units respectively corresponding to each of the photonic crystals of the first photonic crystal group; wherein delay durations of the optical time delay units corresponding to the photonic crystals of the first photonic crystal group that allow the light beams of different colors to pass through are different.

2. The holographic display device according to claim 1, further comprising a second photonic crystal group disposed between the light exiting surface and the spatial light modulator, the second photonic crystal group having the same structure as that of the first photonic crystal group.

3. The holographic display device according to claim 2, wherein the light transmission structure comprises an optical fiber having the light incident surface and the light exiting surface.

4. The holographic display device according to claim 3, wherein the optical fiber comprises a uniform type optical fiber in which refractive indices are uniform throughout a core of the uniform type optical fiber.

5. The holographic display device according to claim 3, wherein the optical fiber comprises a graded optical fiber, a core of which has a refractive index gradually decreasing in a direction from a center of the core to an edge thereof in the graded optical fiber.

6. The holographic display device according to claim 5, wherein
the various photonic crystals of the first photonic crystal group comprise a first photonic crystal capable of transmitting red light, a second photonic crystal capable of transmitting green light, and a third photonic crystal capable of transmitting blue light;
in the direction from the center of the core to the edge thereof in the graded optical fiber, the core of the graded optical fiber comprises a central region corresponding to the third photonic crystal, an intermediate region corresponding to the second photonic crystal and an edge region corresponding to the first photonic crystal.

7. The holographic display device according to claim 6, wherein the first photonic crystal group is symmetrical about a central axis of the graded optical fiber.

8. The holographic display device according to claim 1, wherein
the plurality of photonic crystals comprise a first photonic crystal capable of transmitting red light, a second photonic crystal capable of transmitting green light, and a third photonic crystal capable of transmitting blue light;
the plurality of optical time delay units comprise a first optical time delay unit corresponding to the first photonic crystal, a second optical time delay unit corresponding to the second photonic crystal, and a third optical time delay unit corresponding to the third photonic crystal;
a delay duration of the second optical time delay unit is smaller than a delay duration of the third optical time delay unit, and is greater than a delay duration of the first optical time delay unit.

9. The holographic display device according to claim 1, further comprising a collimator disposed between the light exiting surface and the spatial light modulator.

10. The holographic display device according to claim 1, further comprising a lens structure disposed at a side of the spatial light modulator facing away from the light transmission structure.

11. The holographic display device according to claim 1, wherein the light incident surface and the light exiting surface are disposed opposite to each other in an axial direction of the light transmission structure.

12. The holographic display device according to claim 1, wherein the light incident surface and the light exiting surface are located on the same side of the light transmission structure.

13. An electronic device comprising a holographic display device, the holographic display device comprising:
a light source;
a light transmission structure having a light incident surface and a light exiting surface;
a first photonic crystal group disposed between the light incident surface and the light source, the first photonic crystal group comprising various photonic crystals configured to divide light emitted by the light source into light beams of different colors, the light beams of different colors transmitted into the light transmission structure through the light incident surface, and emitted through the light exiting surface;
a spatial light modulator corresponding to the light exiting surface, containing holographic data, and configured to modulate the light beams of different colors emitted from the light exiting surface to form a holographic image; and
an optical time delay group disposed between the first photonic crystal group and the light incident surface, the optical time delay group comprising a plurality of optical time delay units, each of the optical time delay units respectively corresponding to each of the photonic crystals of the first photonic crystal group; wherein delay durations of the optical time delay units corresponding to the photonic crystals of the first photonic crystal group that allow the light beams of different colors to pass through are different.

14. The electronic device according to claim 13, further comprising a second photonic crystal group disposed between the light exiting surface and the spatial light modulator, the second photonic crystal group having the same structure as that of the first photonic crystal group.

15. The electronic device according to claim 14, wherein the light transmission structure comprises an optical fiber having the light incident surface and the light exiting surface.

16. The electronic device according to claim 15, wherein the optical fiber comprises a uniform type optical fiber in which refractive indices are uniform throughout a core of the uniform type optical fiber.

17. The electronic device according to claim 13, wherein
the plurality of photonic crystals comprise a first photonic crystal capable of transmitting red light, a second photonic crystal capable of transmitting green light, and a third photonic crystal capable of transmitting blue light;
the plurality of optical time delay units comprise a first optical time delay unit corresponding to the first photonic crystal, a second optical time delay unit corresponding to the second photonic crystal, and a third optical time delay unit corresponding to the third photonic crystal;
a delay duration of the second optical time delay unit is smaller than a delay duration of the third optical time delay unit, and is greater than a delay duration of the first optical time delay unit.

18. The electronic device according to claim 13, the electronic device is at least one of a mobile phone, a computer, a television, a watch, and a wristband.

\* \* \* \* \*